Patented Mar. 24, 1925.

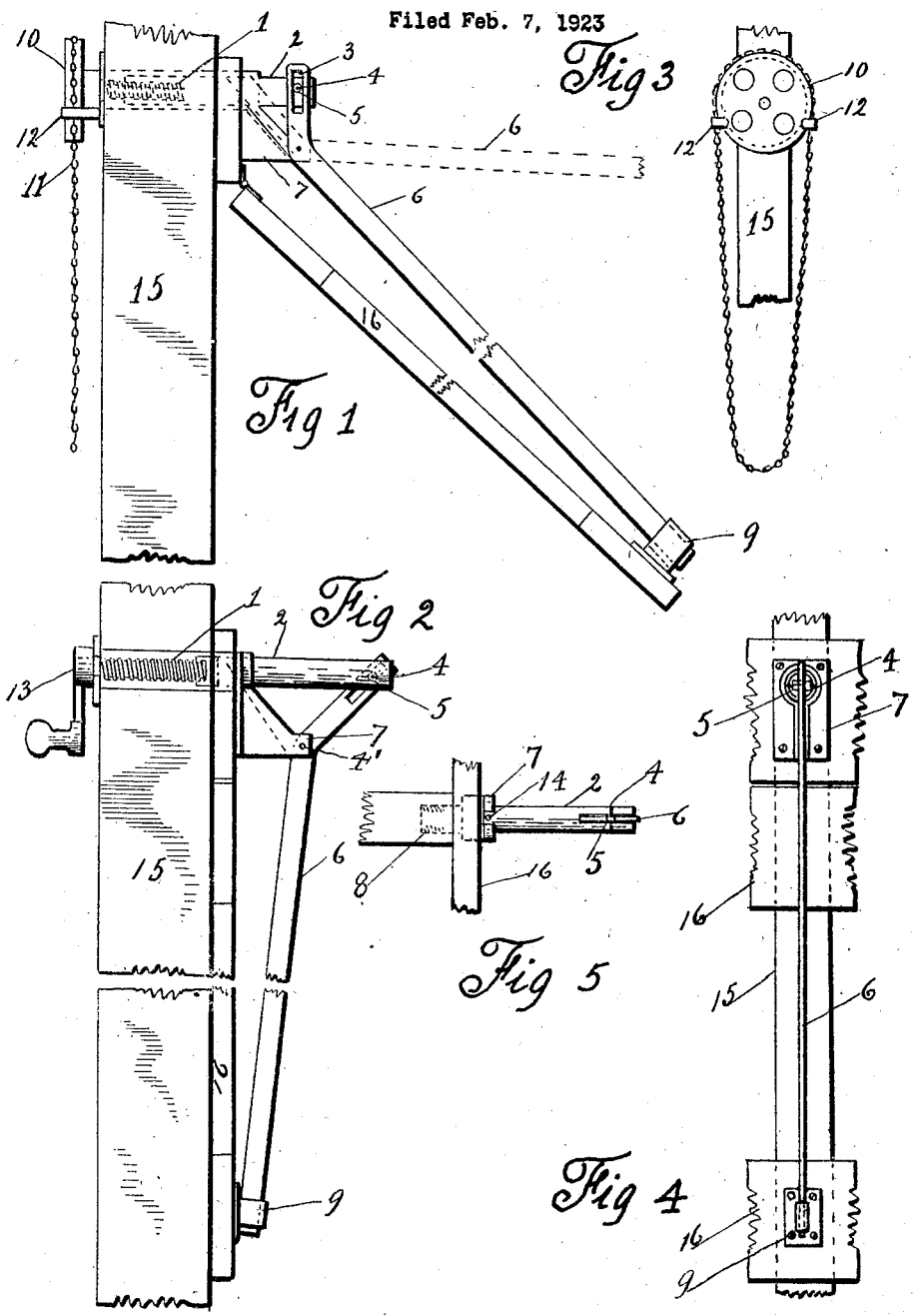

1,531,051

UNITED STATES PATENT OFFICE.

WILLIAM ANDREW TOMLINSON, OF PHOENIX, ARIZONA.

MECHANISM FOR RAISING AND LOWERING AWNINGS OR FLAPS.

Application filed February 7, 1923. Serial No. 617,626.

*To all whom it may concern:*

Be it known that I, WILLIAM ANDREW TOMLINSON, a citizen of the United States, residing at Phoenix, in the county of Maricopa, State of Arizona, have invented certain new and useful improvements in mechanism for raising and lowering awnings or flaps that are used to protect screened rooms, porches, etc., where such awnings or flaps are needed to be raised for ventilation or closed for protection against the weather; and I do hereby declare the following to be a full, clear, and exact description of the invention.

This invention relates to awnings for windows, doors, sides of buildings, et cetera.

I attain these results by the mechanism illustrated in the accompanying drawings, in which Figure 1 is a side elevation showing the mechanism operated by a chain and slotted pulley, showing the flap or awning partly opened.

Fig. 2 is a side elevation showing the flap or awning closed, and the mechanism operated by a crank.

Fig. 3 is a front elevation as seen from the inside of the room showing the mechanism operated by the chain and pulley.

Fig. 4 is an elevation of the mechanism in a closed position as seen from the outside of the building.

Fig. 5 is a plan view of a sleeve of hollow construction and which slides forward or backward as the engaging spiral screw is turned.

Similar numerals refer to similar parts throughout the several views.

The appliance is of metal construction, designed to be fastened by bolts, screws, nails or rivets to the framing of the awning or flap it is desired to operate, (and which flaps or awnings are now in general use) for the purpose of ventilation or protection of the exterior of screened in rooms, porches, etc., and consists of a main rod or lever 6 of sectional dimension sufficient to sustain the weight of the flap or awning to which it is secured. One end of this rod or lever 6 is bent at about an angle of 45 forming a short arm or lever fulcrumed on a pivot 4'.

This pivot is a small bolt or rivet set in a bracket 7 secured to the outside of frame 15, in the upper end of the short arm of the bent rod 6 is a slot 3 by which it is held in place over a loose friction roller 5 on pivot 4 set near the outer end of a hollow internally threaded sleeve or nut 2 and which facilitates the sliding of this sleeve or nut 2 forward and back when the spiral screw 1 suitably mounted in frame 15 is turned either by the chain 11 and slotted pulley 10, or by the crank 13 mounted on the inner end of said screw, and permits the flap or awning 16 to be raised or lowered as desired. In the case where the chain and pulley is used, the guides 12 are used to keep the chain 11 in contact with and in place on the slotted pulley 10. Lubrication of the spiral screw 1 is made through a small hole 14 Fig. 5. The lower end of the long arm of bent rod 6 is kept in place by a metal guide 9.

The sleeve or nut 2 is so mounted in frame 15 that it is freely movable longitudinally but cannot rotate.

In operating the device the chain pulley 10 or the crank 13 is applied to the inner end of the spiral screw shaft 1 and turned in the proper direction to raise or lower the awning. In raising the awning assuming it to be in position indicated in Figure 2, the spiral screw shaft 1 moves the sleeve or nut 2 inwardly and the pin 4 carrying friction roller 5 slides in the slot 3 of the short arm of the lever causing it to fulcrum at the bend and move inwardly toward the bracket, the lower end of the long arm or lever of rod working in guide 9, lifting the awning as indicated in Figure 1. In lowering the awning the spiral screw shaft 1 is turned in the reverse direction.

What I claim is:

1. Mechanism for raising and lowering awnings or flaps, comprising a support, a spiral screw shaft mounted therein, an elongated threaded sleeve traveling on said screw shaft and through said support, a bracket mounted on the outer face of said support, an awning, an operating lever therefor fulcrumed in said bracket, said lever having a long arm guidably connected to the outer face of the awning, and a short arm angularly disposed with respect to the long arm and in sliding engagement with said sleeve, and means engageable with the inner end of said spiral screw shaft for rotating the same.

2. Mechanism for raising and lowering awnings or flaps, comprising a support, a screw shaft journaled therein, a threaded sleeve traveling on said shaft, an awning, an operating lever fulcrumed on the outside of said support and having a long arm movably connected with said awning and a short arm bent at an angle to said long arm, said sleeve slotted longitudinally and having a transverse pin adjacent its outer end, said pin traveling in a slot in the said short arm, and means engageable with the inner end of the screw shaft for rotating the same.

3. Mechanism for raising and lowering awnings or flaps, comprising a support, a spiral screw shaft journaled therein, an elongated threaded sleeve traveling on said screw shaft and having a lever operating pin adjacent its outer end, a bracket mounted on the outside of said support, an awning, an operating lever therefor fulcrumed in said bracket and having a long arm engaging at its free end in a guide mounted on the outer face of the awning, and a short arm angularly disposed with respect to said long arm, said short arm having a slot for said pin of the threaded sleeve.

4. Mechanism for raising and lowering awnings, comprising a support, a screw shaft mounted therein, an awning, an operating lever therefor fulcrumed on said support, and having a long arm extending downwardly and exteriorly of the awning and guidably connected therewith at its free end, said lever having a short arm bent angularly to the long arm, a non-rotative sleeve traveling on said screw shaft and having a slot and pin connection with said short arm, and detachable means for engaging the inner end of the screw shaft for rotating the same.

5. Mechanism for raising and lowering awnings or flaps, comprising a support, a rotatable shaft mounted therein, a hollow sleeve travelling on said shaft and through said support, said sleeve having a lever operating pin adjacent its outer end, a bracket mounted on said support, an awning, an operating lever therefor fulcrumed on said bracket and having a long arm guided at its free end on the face of said awning, and a short arm angularly disposed with respect to the long arm, said short arm having a guideway for said pin of the hollow sleeve.

WILLIAM ANDREW TOMLINSON.